(12) United States Patent
Poustchi et al.

(10) Patent No.: US 7,577,150 B2
(45) Date of Patent: Aug. 18, 2009

(54) PEER DISCOVERY

(75) Inventors: Behrouz Poustchi, Ottawa (CA);
Natalie Ann Gagnon, Carleton Place (CA); James Andrew Stelzig, Gatineau (CA)

(73) Assignee: Avaya, Inc., Basking Ridge, NJ (US)

( * ) Notice: Subject to any disclaimer, the term of this patent is extended or adjusted under 35 U.S.C. 154(b) by 784 days.

(21) Appl. No.: 10/986,297

(22) Filed: Nov. 12, 2004
(Under 37 CFR 1.47)

(65) Prior Publication Data
US 2005/0117525 A1  Jun. 2, 2005

Related U.S. Application Data

(60) Provisional application No. 60/518,646, filed on Nov. 12, 2003.

(51) Int. Cl.
*H04L 12/56* (2006.01)
(52) U.S. Cl. .................. 370/395.3; 370/254; 370/432
(58) Field of Classification Search .............. 370/254, 370/395.3, 432
See application file for complete search history.

(56) References Cited

U.S. PATENT DOCUMENTS

| | | | |
|---|---|---|---|
| 6,249,873 B1 | 6/2001 | Richard et al. | |
| 6,327,252 B1 | 12/2001 | Silton et al. | |
| 6,532,217 B1 * | 3/2003 | Alkhatib et al. | 370/252 |
| 6,775,273 B1 * | 8/2004 | Kung et al. | 370/356 |
| 2003/0193967 A1 | 10/2003 | Fenton et al. | |
| 2003/0204613 A1 | 10/2003 | Hudson et al. | |
| 2004/0006586 A1 | 1/2004 | Melchione et al. | |
| 2004/0064568 A1 | 4/2004 | Arora et al. | |
| 2004/0064693 A1 | 4/2004 | Pabla et al. | |
| 2004/0258074 A1 * | 12/2004 | Williams et al. | 370/395.5 |

FOREIGN PATENT DOCUMENTS

| | | |
|---|---|---|
| EP | 0 993 163 A1 | 9/1999 |
| EP | 1 229 443 A2 | 8/2002 |
| EP | 1 253 766 | 10/2002 |
| WO | WO 01/75652 A2 | 10/2001 |

OTHER PUBLICATIONS

JXTA v2.0 Protocols Specification, Chapter 1.1 "Peer Discovery Protocol", 2001, Sun Microsystems Inc., The Internet Society, http://spec.jxta.org/nonav/v1.0/docbook/JXTAProtocols.html#id2796266.

* cited by examiner

*Primary Examiner*—Jason E Mattis
(74) *Attorney, Agent, or Firm*—Muncy, Geissler, Olds & Lowe, PLLC

(57) ABSTRACT

Upon initial connection of a peer to a peer-to-peer network, the peer notifies other peers of its connection to the network. The peer receives existence notifications from other peers and may use them to create a list of the peers on the network, which may be sorted by the unique identifiers of each peer. A prospective network address is selected, e.g. based on the ordinal position of the peer within the sorted list. Conflict checking resolves conflicts between the prospective network address and the network address of other peers. Each peer may periodically notify the other peers of its network address, e.g. to prevent new peers from claiming the address. When a peer becomes inactive, another peer detecting this may begin periodically notifying the remaining peers that the address of the disconnected peer is already claimed. Peers may be Voice-over-IP telephone sets and network addresses may be directory numbers.

60 Claims, 10 Drawing Sheets

|  | 210 | 220 | 230 | 250 | 293 |
|---|---|---|---|---|---|
|  | DN | MAC ADDRESS | IP ADDRESS | DEV | ACTIVE |
|  | 201 | 00-05-78-6B-44-A7 | 192.168.1.1 | SET | True |
|  | 202 | 00-05-78-6B-44-A8 | 192.168.1.2 | SET | False |
|  | 203 | 00-05-78-6B-44-A9 | 192.168.1.3 | SET | False |
|  | 204 | 00-05-78-6B-44-B0 | 192.168.1.4 | SET | True |
|  | N | xx-xx-xx-xx-xx-xx | 192.168.x.x | 1 | bool |

FIG. 4

PEER DISCOVERY

CROSS REFERENCE TO RELATED APPLICATIONS

The present application claims the benefit of prior provisional application Ser. No. 60/518,646 filed Nov. 12, 2003, the contents of which are hereby incorporated by reference hereinto.

FIELD OF THE INVENTION

The invention relates to peer discovery in communications networks.

BACKGROUND OF THE INVENTION

In many known circuit-switched or packet-switched telephony solutions, a centralized piece of equipment (e.g. a switch or Private Branch Exchange (PBX)) provides call termination, call processing, switching and/or call handling capabilities. In large systems, the central equipment may be a powerful computer controlling a number of functions on circuit boards called line cards, which connect telephone sets to the computer. In small systems (e.g. in systems having ten or fewer terminal sets), the central intelligence may actually reside in a "golden" telephone set that is specially designed to hold the central processing equipment.

Regardless of the form the central equipment takes, a number of terminal sets (e.g. wired or wireless telephone sets) are usually connected to the central equipment. The terminal sets are typically "dumb" devices in comparison to the central equipment. That is, terminal sets may simply send hook-switch information and key presses (e.g. Dual Tone Multi-Frequency or DTMF tones) to the central equipment and convert signals from the central equipment such as a dial-tone, ringing tone, or voice signals into sound (or, in some cases, images or video). The terminal sets are typically unaware of the existence of any other terminal sets, and have no inherent capacity to interconnect themselves with another terminal set.

In centralized telephony systems, administration and discovery of telephone sets within a network is typically performed by the central equipment. For example, in a traditional circuit-switched Time Division Multiplexing (TDM) telephony system, for example, each terminal set may be connected to a port on the central call processing equipment. Typically, as part of an initialization sequence which occurs on power-up, each terminal set announces its availability to the central equipment. The central equipment monitors each port for such announcements as new terminal sets are connected, and is thus capable of "discovering" newly-added terminal sets.

In centralized Voice-over Internet Protocol (IP) or VoIP telephony systems, a very similar but slightly more complicated procedure is employed; however, a terminal set still announces its availability to the central call processing equipment via the network. As is known in the art, VoIP is the transmission of calls over a data network based on the IP. Communication takes the form of packet data, thus there is no fixed connection as in the case of circuit-switched networks. The communication can be text, voice, graphics or video. IP equipment may adhere to such standards as H.323 and Session Initiation Protocol (SIP) for interoperability. The H.323 standard generally describes how multimedia communication is to occur between terminals, network equipment and services. The SIP standard covers the technical requirements to set up, modify and tear down multimedia session over the Internet. As used herein, the term "call" refers to a multimedia communication between two endpoints, and includes a voice telephone call.

Regardless of whether central equipment is circuit switched or packet switched, during the course of discovering a new terminal set the central equipment will usually automatically assign and manage a Directory Number (DN), which is a form of network address. The DN may be, e.g., a PBX extension. As DNs are assigned to different sets, the DNs are added to a list of DNs maintained at the central equipment. Often, it is only on the basis of this centralized list that the centralized equipment is able to determine the identity of the physical terminal set that should be called when a DN is forwarded from a calling terminal set.

Due to limitations in the provided number of ports (e.g. telephone terminations) and processing power (e.g. processor type and speed), a centralized piece of equipment typically has an upper limit as to the number of users which can be accommodated and the amount of call processing capacity which can be provided. A customer may wish to upgrade to larger central equipment once the number of ports and/or call-processing requirements capacity of their current equipment is exceeded. Disadvantageously, such upgrades typically entail significant expenditures and may be disruptive.

As the costs associated with greater processing capacity and memory continue to decrease, the inclusion of a call-processing engine in every telephone set connected to a network is becoming feasible. In such systems, it may be desirable to eliminate the central equipment. Such a decentralized system may be referred to as a distributed telephony system. Disadvantageously, the above-described approach for terminal set discovery is ill-suited for a decentralized system, since no centralized equipment may exist.

Accordingly, in a distributed telephony system, an alternative manner of discovering terminal sets or other forms of network devices would be desirable. More generally, in a peer-to-peer system such as distributed multimedia communications system, a manner of discovering terminal sets or other forms of network devices would be desirable.

SUMMARY OF THE INVENTION

Upon initial connection of a peer to a peer-to-peer network, the peer notifies other peers of its connection to the network. The peer receives existence notifications from other peers and may use them to create a list of the peers on the network, which may be sorted by the unique identifiers of each peer. A prospective network address is selected, e.g. based on the ordinal position of the peer within the sorted list. Conflict checking resolves conflicts between the prospective network address and the network address of other peers. Each peer may periodically notify the other peers of its network address, e.g. to prevent new peers from claiming the address. When a peer becomes inactive, another peer detecting this may begin periodically notifying the remaining peers that the address of the disconnected peer is already claimed. Peers may be Voice-over-IP telephone sets and network addresses may be directory numbers.

In accordance with an aspect of the present invention there is provided at one network device of a plurality of network devices, a method comprising: sending an existence notification; receiving one or more existence notifications from one or more other network devices; and based on the received existence notifications, selecting a prospective network address for said one network device.

In accordance with another aspect of the present invention there is provided a in a network including a first network device, a second network device, and at least one other network device, a method of maintaining a network address of the first network device, comprising: at said second network device: maintaining said network address of said first network device; and upon determining that said first network device is inactive, notifying said at least one other network device that said network address of said first network device has been claimed.

In accordance with yet another aspect of the present invention there is provided a method for use at a network device comprising maintaining a state machine including a first state and a second state, said first state indicating that said network device has selected a prospective network address, said second state indicating that said network device has claimed said prospective network address as its network address.

In accordance with yet another aspect of the present invention there is provided a network device for use with one or more other network devices, said network device and said other network devices cumulatively forming a plurality of network devices, said network device adapted to: send an existence notification; receive one or more existence notifications from said other network devices; and based on the received existence notifications, select a prospective network address for said network device.

In accordance with yet another aspect of the present invention there is provided a network device for connection to a network including an inactive network device and at least one other network device, adapted to: maintain said network address of said inactive network device; and upon determining that said inactive network device is inactive, notify said at least one other network device that said network address of said inactive network device has been claimed.

In accordance with yet another aspect of the present invention there is provided a network device adapted to maintain a state machine including a first state and a second state, said first state indicating that said network device has selected a prospective network address, said second state indicating that said network device has claimed said prospective network address as its network address.

In accordance with yet another aspect of the present invention there is provided a machine-readable medium including machine-executable code for execution at one network device of a plurality of network devices, comprising: machine-executable code for sending an existence notification; machine-executable code for receiving one or more existence notifications from one or more other network devices; and machine-executable code for selecting a prospective network address for said one network device based on the received existence notifications.

In accordance with yet another aspect of the present invention there is provided a machine-readable medium including machine-executable code for execution at a network device in a network including an inactive network device and at least one other network device, comprising: machine-executable code for maintaining said network address of said inactive network device; and machine-executable code for, upon determining that said inactive network device is inactive, notifying said at least one other network device that said network address of said inactive network device has been claimed.

In accordance with yet another aspect of the present invention there is provided a machine-readable medium storing machine-executable code which, when executed by a network device, causes said network device to maintain a state machine including a first state and a second state, said first state indicating that said network device has selected a prospective network address, said second state indicating that said network device has claimed said prospective network address as its network address.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Exemplary embodiments of the invention will now be described with reference to the attached drawings in which:

FIG. 4 is a routing table of the terminal set of FIG. 2;

DETAILED DESCRIPTION

Figure 1:
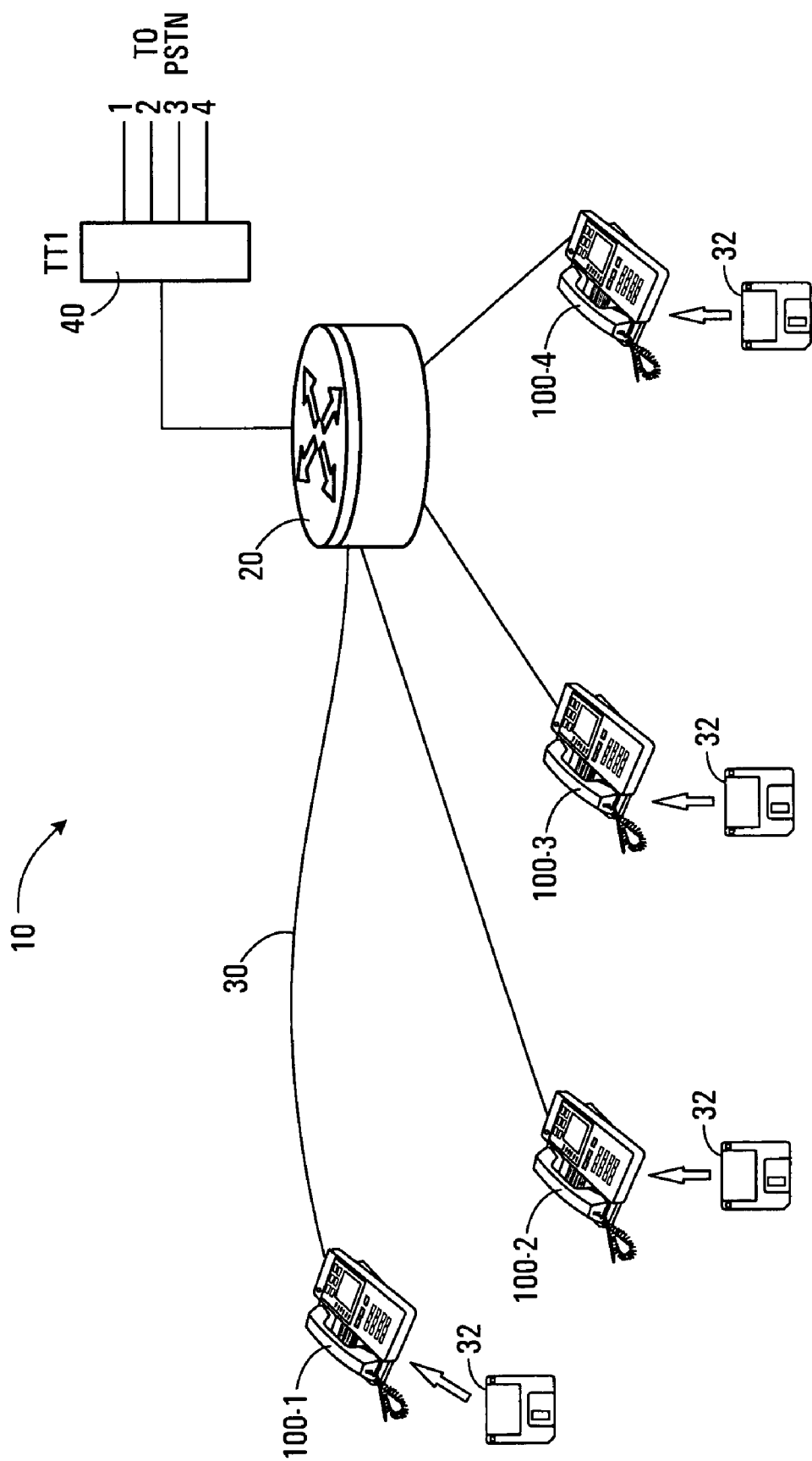
FIG. 1 is a telephone system including multiple networked terminal set ("peers") capable of peer discovery according to an embodiment of the invention.

In overview, in an exemplary distributed telephony system lacking a central piece of routing or switching equipment, certain features may be desirable. One desirable feature may be a capability of automatically assigning a unique DN to each terminal set upon initial connection of the terminal set to a network, preferably with an effort being made to minimize conflict between the DNs chosen by different terminal sets in the network. Another desirable or mandatory feature is to ensure that each terminal set is made aware of the DN of every other terminal set connected to the network, so that each terminal set is capable of making calls to other terminal sets. A further desirable feature is the capability of preserving a DN assigned to a terminal set even upon disconnection of the terminal set from the network or upon loss of power of the terminal set (either of these resulting in a terminal set becoming "inactive"). The motivation for preserving the DN may be to prevent the DN of the inactive terminal set from being reassigned as a result of temporary disconnection of the terminal set from the network (due to, e.g., a faulty connection between the terminal set and the network, a simple loss of power, or a wireless terminal set moving out of range), which reassignment could result in confusion on the part of a calling party as which terminal set has been called.

To support these features, a terminal set (e.g. a telephone set, Portable Digital Assistant (PDA), Personal Computer (PC), wireless terminal, Think Trunk Interface (TTI), or other network device) exemplary of an embodiment of the present invention, upon initial connection to a network in a "factory fresh" (i.e. as yet unconfigured) state, notifies the other terminal sets on the network (its "peers") of its connection to the network by way of a network connection notification. The network connection notification includes a unique identifier associated with the terminal set, such as a Media Access Control (MAC) address for example. As is known in the art, a MAC address is a unique hardware address or hardware number which serves as a unique identifier for a network device. The network connection notification may take the form of an "I_AM_HERE" message which is sent multiple times in order to increase the likelihood that the message will be received (at least in the case where no acknowledgement is sent by the other peers for each received message, as in the present embodiment).

The newly-connected terminal set also receives existence notifications from other terminal sets. An existence notification is an indication of a the existence a terminal set which either currently has a presence on the network (i.e. is active and connected to the network) or previously had a presence on the network (i.e. was previously active and connected but has now become disconnected and inactive). In the present embodiment, an existence notification may be any of an "I_AM_HERE" message (previously described), a "PEER_ASSERT" message (described below), or an "INACTIVE_PEER_ASSERT" message (described below). Each existence notification includes the unique identifier of the terminal set in respect of which the message was sent. The latter two types of messages ("PEER_ASSERT" and "INACTIVE_PEER_ASSERT" messages) additionally provide an indication of already claimed DNs, and are only received when the newly-connected terminal set is joining a network in which at least one terminal set has already claimed a DN.

From the existence messages, a list of all of the terminal sets on the network (referred to as a routing table), is created. The terminal sets in the list are sorted by their unique network device identifiers. For any terminal sets which have already claimed DNs, the claimed DN will be indicated in the sorted list. The newly-connected terminal set will have an ordinal position within the list.

To select a prospective DN, the newly-connected terminal set may add an offset associated with its ordinal position in the list to a base DN. For example, in a system where the DN represents a PBX extension, assuming that the new terminal set is third in a list of five terminal sets, the prospective DN may be determined to be 203 (an offset equal to the terminal set's ordinal position, i.e. 3, plus a base DN of 200). By basing the selection of a prospective DN on the unique ordinal position associated with the terminal set, selection of unique prospective DNs by different terminal sets will be promoted. This assumes a scenario in which multiple factory-fresh terminal sets simultaneously join a network having no existing terminal sets with previously assigned DNs. The rationale is to try to prevent different terminal sets from initially selecting the same prospective DN, which may result in time-consuming conflict resolution processing.

Upon selecting its prospective DN, the newly-connected terminal set will then notify each other terminal set of its prospective DN. This is referred to as a "DN Probe". If no other terminal set objects to the claiming by the newly-connected terminal set of the prospective DN (with any objection possibly being based on an existing claim to that DN by one of the other terminal sets), the newly-connected terminal set claims the prospective DN as its own. The newly-connected terminal set may allow a pre-determined time interval to elapse before claiming its prospective DN, to provide sufficient time for the other terminal sets to raise any objections.

Assuming that the prospective DN has been successfully claimed, the newly-connected terminal set notifies each other terminal set of its claim to that DN. The newly-connected set also stores the claimed DN in non-volatile memory, so that the assigned DN may be recalled if the terminal set loses power. The routing table may also be stored.

In the event that the newly-connected terminal set is joining an established network, the other terminal sets on the network may already have selected their DNs. In this case, it is possible that the prospective DN chosen by the newly-connected terminal set may already be assigned to one of the existing terminal sets. For example, if the ordinal position of the newly-connected terminal set within the sorted list of terminal sets is other than at the end of the list (e.g. if the unique identifier of the new terminal set places it somewhere in the middle of the sorted list), the prospective DN that will result when the offset associated with the ordinal position of the newly-connected terminal set is added to the base DN may represent the DN of one of the existing terminal sets.

In view of this possibility, before the newly-connected telephone attempts to notify any other terminal set of its prospective DN, it first consults its routing table to determine whether the prospective DN is already claimed by any other terminal sets in the network. If the prospective DN is already claimed by another set, the newly-connected DN may select another prospective DN, e.g. by adding an offset such as 1 to the largest DN found in the list, before notifying any of the other terminal sets of its choice. This may avoid unnecessary communications overhead on the network which might otherwise result if the newly-connected terminal set notifies each other terminal set of its prospective DN only to receive an objection from one of the other terminal sets which has already claimed that DN.

Once a newly-connected terminal set has successfully claimed a DN, the terminal set periodically notifies the other terminal sets on the network of its claim to that DN. In the present embodiment, each periodic notification takes the form of a "PEER_ASSERT" message which serves as a "heartbeat" of the newly-connected terminal set, indicating continued network presence and a continued claim to its DN. The notifications are monitored by the other terminal sets on the network. In the present embodiment, the periodic notifications occurs at random time intervals (e.g. between 0 and 2 seconds). If a predetermined amount of time elapses without receipt of a notification from a terminal set, that terminal set is presumed to have become inactive. The periodic notification also serves to prevent a subsequently-added terminal set from attempting to claim that DN as its own. For example, if another terminal set has selected that DN as its prospective DN and is awaiting any objection from other terminal sets, the notification may serve as an objection to the claim of that DN by that terminal set. Express objections (e.g. DN_CONFLICT messages) may also be sent.

If a terminal set that has claimed a DN disconnects from the network or loses power, it will likely be incapable of periodically notifying the other terminal sets on the network of its claim to its DN. In this case, another terminal set in the network which has become aware of the inactivity of the disconnected terminal set (e.g. by the absence of any recent PEER_ASSERT messages from that terminal set) steps in and begins periodically notifying the other terminal sets on the network of the fact that, although the disconnected terminal set is inactive, its DN has already been claimed. The terminal set which has stepped in, which is referred to as a "surrogate" for convenience, is responsible for sending these periodic notifications (which take the form of "INACTIVE_PEER_ASSERT" messages, described below) in addition to periodically notifying the other terminal sets of its claim to its own DN. An algorithm may be applied to decide which terminal set should be the surrogate for an inactive terminal set. The surrogate's periodic notifications sent on behalf of the inactive terminal set may prevent a subsequently-added terminal set from attempting to claim the DN of the disconnected terminal set as its own.

If the disconnected terminal set later reconnects with the network, it may resume notifying the other terminal sets of its DN (which it may recall from its non-volatile memory) on its own behalf. When the surrogate terminal set detects the reconnection, it may cease notifying the other terminal sets of the reconnected terminal set's DN, since the reconnected terminal set has reassumed this responsibility.

Referring to FIG. 1, shown is a telephony system 10 (or "telephone system 10z") which makes use of peer discovery according to an embodiment of the invention. The telephone system 10 has a (Thin Trunk Interface) TTI 40 and a plurality of telephone sets 100-1 through 100-N (each a form of terminal set and a form of network device) connected to a Local Area Network (LAN) 30 through a switch 20. Alternatively, the switch 20 may be replaced with a network hub. Only four telephone sets are shown for clarity; however, there may be a total of N telephone sets where N≧2 and furthermore, in some embodiments of the invention N is a large number, for example in the thousands. The Thin Trunk Interface 40 is, for example, a basic Analog or digital T1/E1 interface or any other PSTN interface and provides a local central office or (Public Switched Telephone Network) PSTN interworking interface and is coupled to a number of telephone "lines" 1, 2, 3, 4. Lines 1, 2, 3, 4 are wire pairs representative of facilities provided by a local central office or PSTN (not shown). In some embodiments of the invention, there are many lines requiring multiple Thin Trunk Interfaces. For example, if 8 lines are required to the PSTN then a second Thin Trunk Interface can be added to the system 10.

Unlike conventional centralized telephony systems, the system 10 of FIG. 1 features distributed call processing. This distributed call processing may feature a number of capabilities including distributed voice mail for example.

Figure 2:
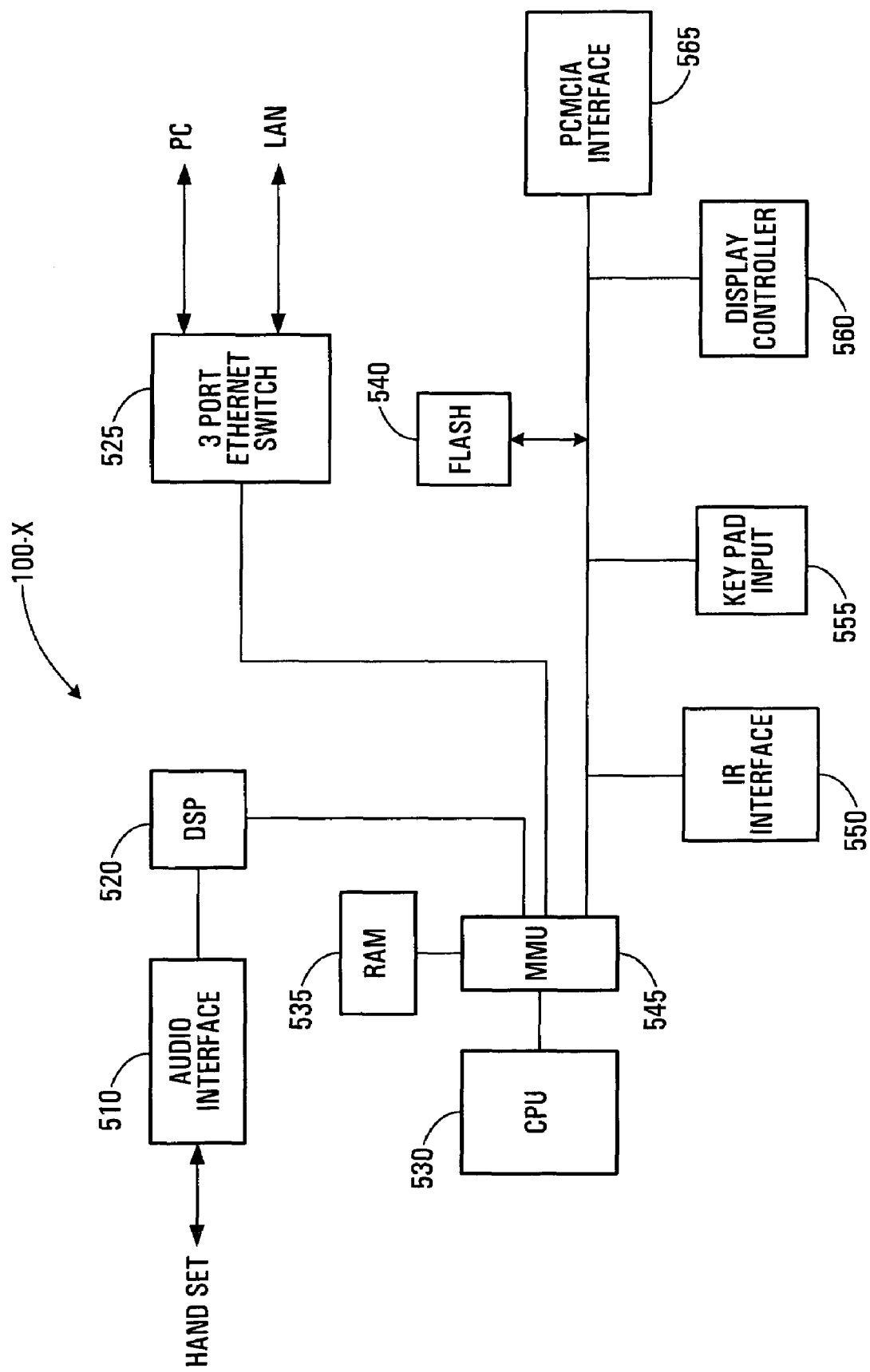
FIG. 2 is a partial circuit block diagram of a terminal set of the telephone system of FIG. 1.

Referring to FIG. 2, shown is a partial circuit block diagram of an exemplary telephone set 100-X (where X=1 to N) of the telephone system 10 of FIG. 1. A Central Processor Unit (CPU) 530, a Memory Management Unit (MMU) 545 and a Random Access Memory (RAM) 535 provide the basis of a computational device. This computational device is connected to a Digital Signal Processor (DSP) 520 for encoding and decoding audio signals. The DSP 520 connects to an audio interface 510. The computational device is also connected to a 3-port switch 525 to allow connection to a LAN and a Personal Computer (PC). The computational device is also connected to a host of peripherals such as a Flash non-volatile memory 540, an Infra Red (IR) interface 550, a Keypad and button interface 555, a Liquid Crystal Display (LCD) controller 560, and a Personal Computer Memory Card International Association (PCMCIA) Interface 565 to allow for standardized expansion of the terminal set 100. While a specific architecture is shown, more generally any packet based (e.g. Internet Protocol (IP)) telephone may be used, assuming sufficient processing and memory capacity is available to implement the methods described below. For example, an off-the-shelf IP phone such as those manufactured by Mitel, Nortel Networks, Avaya, Siemens, NEC, Pingtel or 3COM could be used (e.g. Nortel i2004, Siemens optiPoint 410, or Avaya 4610).

Figure 3:
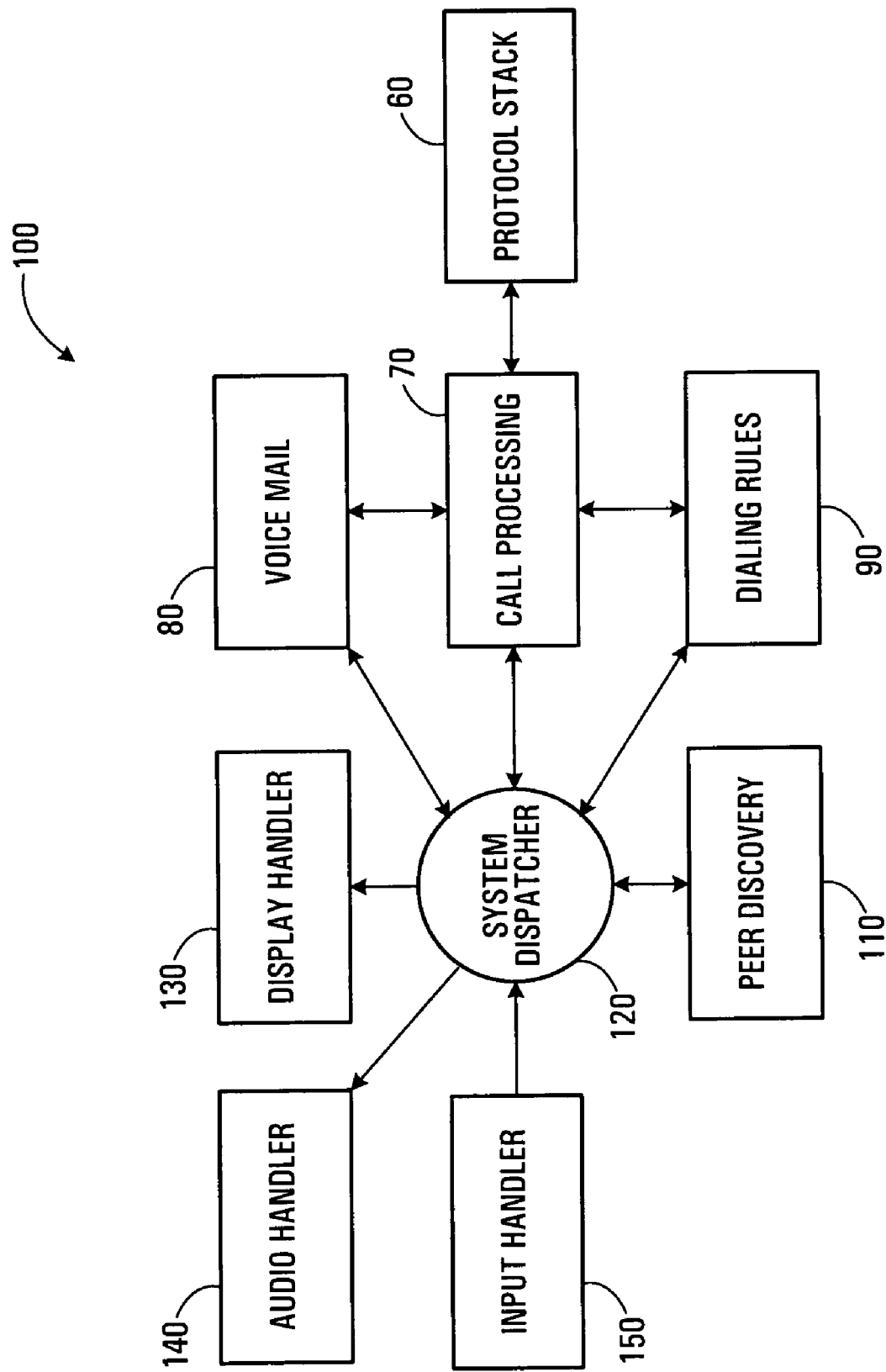
FIG. 3 is a functional block diagram of software operating on the terminal set of FIG. 2.

Referring to FIG. 3, shown is a functional block diagram of software operating on the telephone set 100-X of FIG. 2. The software is typically stored in RAM 535 of FIG. 2 and run on CPU 530, and may be loaded from a machine-readable medium 32 which could be a magnetic or optical disk, a tape, a chip, or another form of primary or secondary storage. More generally, the software can be implemented as any suitable combination of machine-executable code stored in memory for execution by general or special purpose processors, firmware, hardware, Application Specific Integrated Circuits (ASICs), Field-Programmable Gate Arrays (FPGAs), general or special purpose logic.

A system dispatcher 120 provides communication and scheduling between various functional elements which include a call processing module 70, a voice mail module 80, a dialing rules module 90, a peer discovery module 110, a display handler 130, an audio handler 140 and an input handler 150.

The call-processing module 70 interacts with a protocol stack 60 to set up and tear down a call, and set up voice channels. The call processing modules 70 of a number of sets collectively serve to deliver PBX-like call processing capabilities in a distributed fashion without the need for centralized equipment.

Voice mail module 80 provides voice mail service when a call is received and a user is unable to answer the call.

The dialing rules module 90 contains and applies a set of dialing rules for the call-processing module 70 which control how calls are made.

The peer discovery module 110 facilitates peer discovery when a terminal set 100-X is initially connected to a network. The peer discovery module 110 is the focus of the present description, and will be described in detail below.

The display handler 130 is responsible for formatting and displaying information to a user.

The audio handler 140 is adapted to play audio tones such as ringing, busy, call waiting tone or adapted to connect to a voice channel from the network to the handset speaker (or speaker phone) upon receipt of an audio message from the system dispatcher 120.

The input handler 150 is responsible for monitoring such functions as key press, hook switch, volume keys, hands free and mute button and for informing the system dispatcher 120 of appropriate actions to take.

FIG. 4 illustrates a routing table 200 that is created and maintained by each terminal set 100-X in the telephony system 10. The routing table represents an indication of the other terminal sets having a presence on the LAN 30 (including terminal sets which may have become inactive). As will be described, a terminal set 100-X creates routing table 200 by storing information from multiple "I_AM_HERE" messages, and possibly other types of messages (e.g. "PEER_ASSERT" messages), received from other terminal sets on the network 30. In the present embodiment, routing table 200 also includes an entry for the current terminal set 100-X, so that the table 200 represents a summary of all of the terminal sets associated with the network 30.

As shown in FIG. 4, the routing table 200 stores various types of information regarding each of the terminal sets having a presence on network 30, including a DN (column 210), MAC address (column 220), IP address (column 230), device type (column 250), and an active flag (column 293).

The DN (column 210) is a directory number, which is analogous to a PBX extension. When a DN appears in column 210 for a terminal set, that DN is understood to have been claimed by that terminal set. When a terminal set has not yet claimed a DN (e.g. if it has just announced its presence on the network 30 or has only selected a prospective DN which has not yet been decisively claimed), the column 210 will be empty for that terminal set. Although the DNs in column 210 are shown in ascending order in FIG. 4, it will be appreciated that the DNs could be in non-ascending or non-sequential order, depending upon the order in which the terminal sets are added to the network and other factors, as will become apparent.

The MAC address (column 220) is a unique hardware address or hardware number which serves as a unique identifier for each terminal set. As will be appreciated, MAC addresses may be used in the present embodiment to resolve conflicts when the same DN is selected by different terminal sets. A MAC address will be specified in column 220 for every terminal set appearing in the routing table 200. In the routing table 200, the terminal sets are sorted in ascending MAC address order. An alternative embodiment could sort the terminal sets in descending order.

The IP address (column 240) represents the IP address assigned to each terminal set, in the case of VoIP terminal sets for example.

Device type (column 250) is an indication of the type of each network device on the network 30. In the present example, each network device is a terminal set (identified by the value "SET" in column 250). In alternative embodiments, network device may include other types of devices, such as gateways or a thin trunk interfaces for example. Peer discovery as described herein may be performed for network devices regardless of device type.

The active flag (column 293) is an indication of whether or not a terminal set is currently active. As previously described, terminal sets periodically send PEER_ASSERT messages to other terminal sets to inform the other terminal sets that they are still active. If no PEER_ASSERT message has been received by an terminal set 100-X for a predetermined time interval (e.g. three times a predetermined fixed duration between PEER_ASSERT messages, which fixed duration may for example be two seconds), the status of the terminal set for which no PEER_ASSERT messages have been received is set to inactive in the routing table 200 maintained by terminal set 100-X. Once the inactive terminal set resumes sending PEER_ASSERT messages, the status of that terminal set is reset to active.

Figure 5:
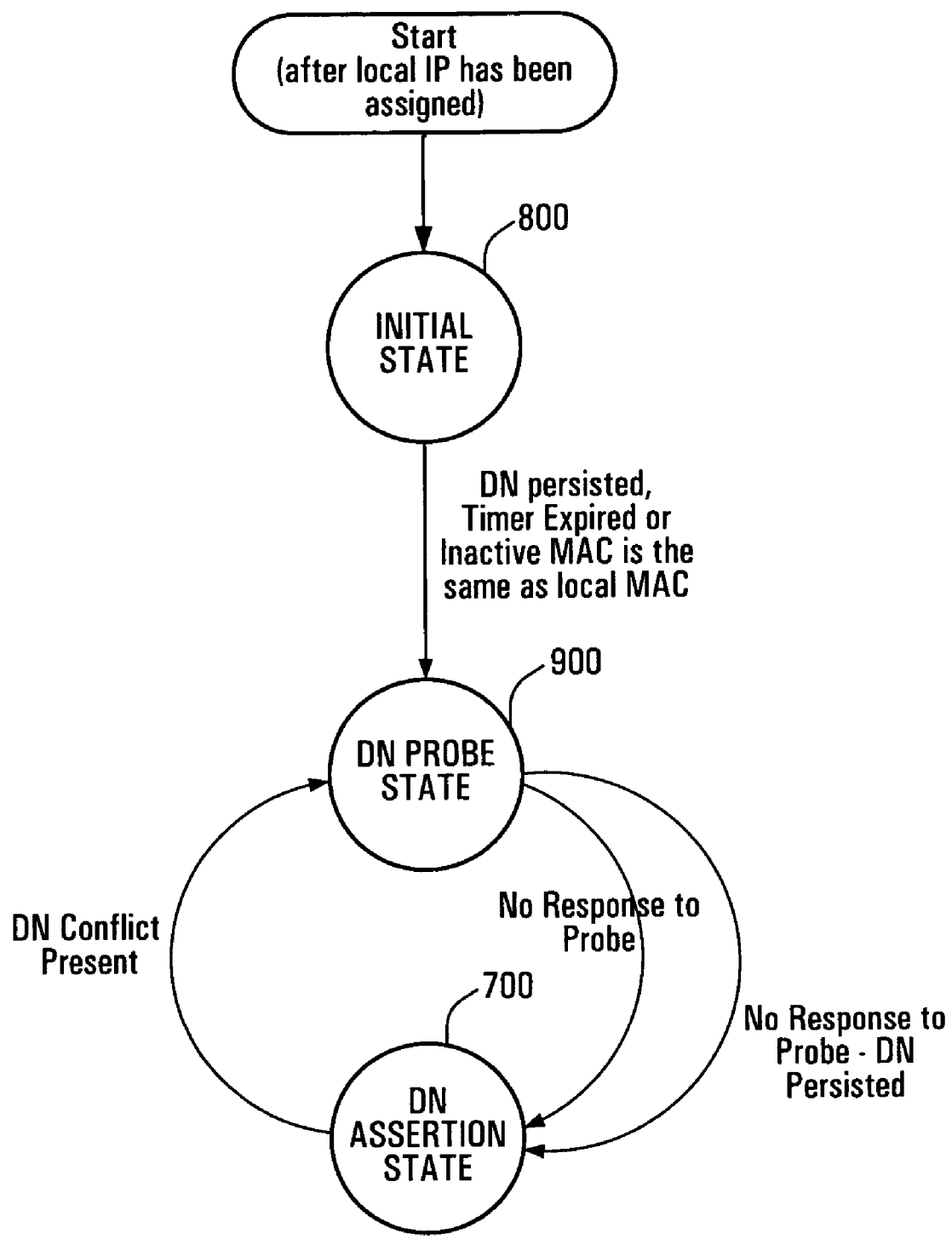
FIG. 5 is a state machine implemented by a terminal set during peer discovery in a distributed peer-to-peer network, according to an embodiment of the invention.

FIG. 5 illustrates a state machine implemented by an exemplary terminal set 100-X during peer discovery according to an embodiment of the invention. For purposes of FIG. 5, is assumed that the terminal set 100-X, during the process of powering up and initialization, has obtained an IP address either from a Dynamic Host Configuration Protocol (DHCP) server on a respective network or by using a zeroconf (Internet Engineering Task Force standard, currently in Request For Comments (RFC) editor's queue as "draft-ietf-zeroconf-ipv4-linklocal-17.txt") in a manner that is known to those skilled in the art.

Once the IP address has been obtained the terminal 100-X set enters initial "I_AM_HERE" state 800 indicating that that terminal set 100-X has a presence on the network 30. In this state 800, terminal set 100-X "announces itself" by notifying the other terminal sets on network 30 of its presence on the network 30 and starts receiving notifications from other network devices regarding their presence on the network 30. In the present embodiment, the terminal set 100-X announces itself by way of an I_AM_HERE message containing the MAC address and IP address of the terminal set 100-X which is multicast to other terminal sets in the network. As is well-known by those skilled in the art, "multicasting" refers to the transmission of a single message to multiple recipients which may be a subset of the total number of potential recipients on a network. When the same message is to be sent to a group of recipients, multicasting may be more efficient that broadcasting (in which case all network devices, even those to whom the message is not intended, receive the message) and unicasting (point-to-point transmissions between two network devices, which is repeated once per intended recipient). In the case of VoIP terminal sets, the multicasting may be IP multicasting as described in RFC 1112 entitled "Host extensions for IP Multicasting", which will be familiar to those skilled in the art.

The terminal set sends the I_AM_HERE multicast message N times, where N is a positive integer greater or equal to 1. In embodiments in which terminal sets form part of a very large network, it is possible that several or all terminal sets be powered simultaneously and thus respective receive buffers at the terminal sets within the network may receive several messages at one time. In some embodiments of the invention, for each terminal set, N is equal to three or higher to ensure that the I_AM_HERE multicast messages are delivered to the other terminal sets even if the receive buffers have overflowed. The I_AM_HERE multicast messages are sent at random intervals (e.g. each between zero and two seconds). Sending the N I_AM_HERE messages at random intervals, rather than at fixed intervals, may reduce the risk of the I_AM_HERE multicast message not being received by one or more terminal sets. If fixed intervals were used, the order in which I_AM_HERE messages from different terminal sets would appear at a given terminal set during each of the N transmission intervals may be the same for each interval, and the messages arriving last may be consistently dropped. By sending messages at random intervals, the order in which messages arrive during one interval may differ from the order in which they arrive during another interval. Thus the terminal set(s) whose message(s) is (are) dropped may change from interval to interval, and there may be a greater likelihood that one of the N I_AM_HERE messages from a particular terminal set will be received.

It is noted that the above description assumes a messaging protocol in which the receipt of individual messages is not expressly acknowledged, which may be favored in view of a possible reduction in overall message traffic in comparison to a protocol in which an express acknowledgement is sent upon the successful receipt of a message.

While in Initial State 800, the terminal set 100-X also waits for messages from other terminal sets within the network 30 which contain information necessary to build or update the routing table 200 (FIG. 4).

From the Initial State 800, the state machine transitions to a DN Probe State 900 upon the occurrence of any of three events. The first event is the expiry of a predetermined time interval intended to provide sufficient time for the terminal set 100-X to receive I_AM_HERE messages from other terminal sets and build its routing table 200. The second event is a determination that the current terminal set 100-X already has a DN stored in its non-volatile memory. The third event is the receipt of an INACTIVE_PEER_ASSERT message having a MAC address which matches the MAC address of the current terminal set 100-X, which reflects a situation in which the current terminal set 100-X is returning to the active state and has just received an INACTIVE_PEER_ASSERT message sent on its behalf by its surrogate.

In the DN Probe State 900, the terminal set 100-X selects a prospective DN and sends M DN_PROBE multicast message to the other terminal sets to determine whether any of the other terminal sets have any objections to set 100-X claiming the prospective DN, where M is an integer greater than or equal to one. The rationale for possibly sending more than one DN_PROBE message is to increase the likelihood that each of the other terminal sets on the network will receive at least one copy of the message. In the present embodiment, the DN_PROBE message contains the MAC address and IP address of the sending terminal set as well as the prospective DN selected by the sending terminal set. If there is no response to the DN_PROBE messages from the other terminal sets, it is assumed that no other terminal set has any objection, and the terminal set 100-X enters a DN Assertion State 700 in which it claims the DN as its own. This is done regardless of whether the prospective DN of the current terminal set is a freshly selected DN or a persistent DN recalled from non-volatile memory.

The DN Assertion State 700 represents the steady state in which the terminal set 100-X has successfully claimed a DN. In this state, the terminal set 100-X periodically sends a PEER_ASSERT multicast message to the other terminal sets within the network to provide a periodic indicator that the terminal set remains active and "healthy". The PEER_ASSERT message of the present embodiment includes an IP address, a MAC address, and a claimed DN. If a conflict is found to exist between the claimed DN and a DN claimed by another terminal set while in the DN Assertion State 700, the state machine transitions back to DN Probe State 900. An example of a situation in which a conflict may be found to exist may be the case in which a network becomes segmented into two sub-networks (e.g. upon failure of a Virtual Private Network (VPN) which normally interconnects two sub-networks in geographically remote locations). While the network is segmented, it is possible that terminal sets may be plugged into the separate segments, with different terminal sets on different sub-networks claiming the same DN. When the network segments are re-connected, a conflict may be found to exist. In this case, resolution of the conflict is necessary.

Figure 6:
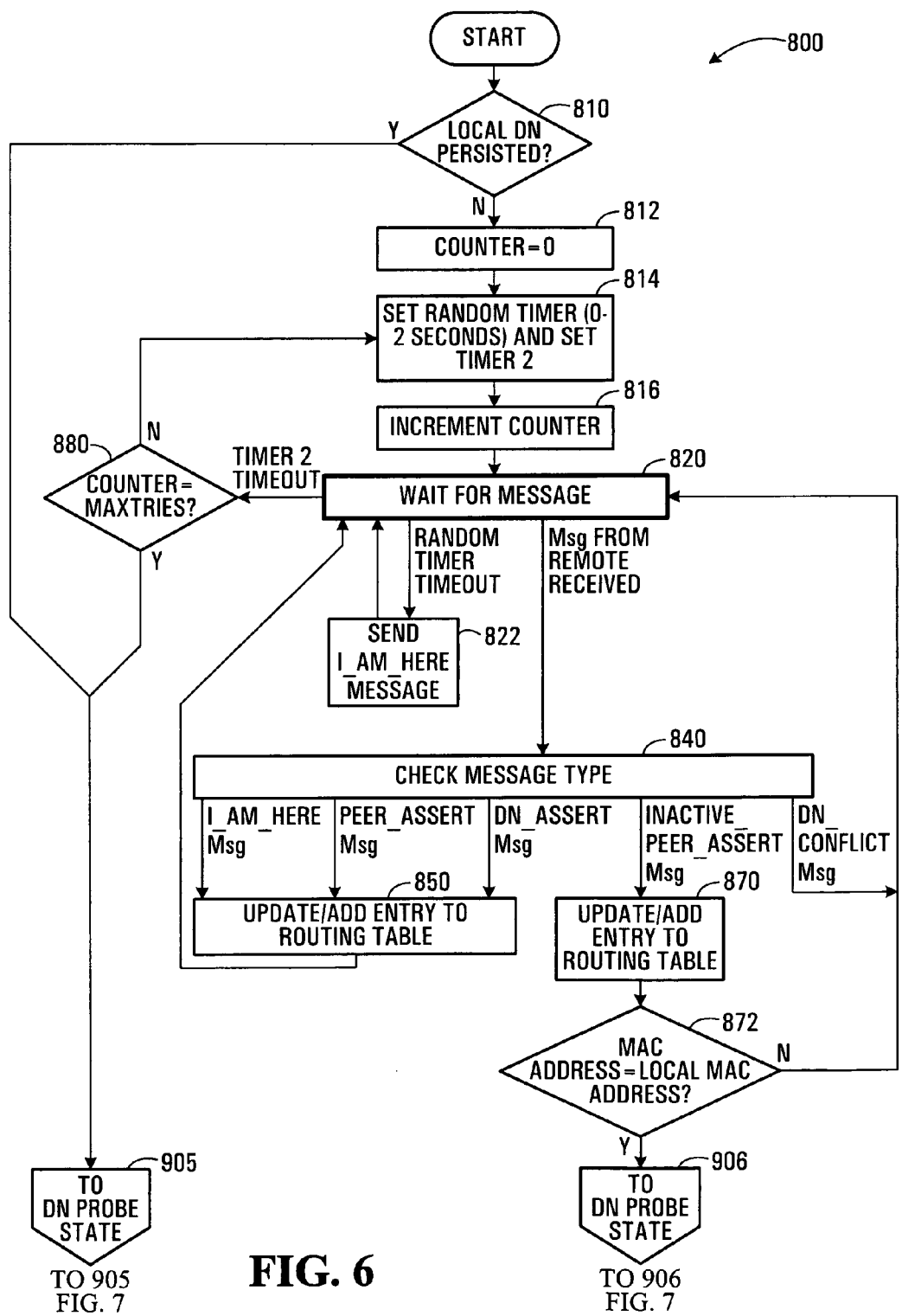
FIG. 6 is a flow chart illustrating operation of a terminal set in an Initial State shown in FIG. 5.

FIG. 6 is a flow chart illustrating operation of a terminal set 100-X in the Initial State 800 of FIG. 5. Initially, a determination is made as to whether or not a DN for the current terminal set 100-X has persisted (810). In the present embodiment, a DN will have persisted if the terminal set 100-X has previously been through the initialization state 800, the DN Probe State 900 and the DN Assertion State 700, so as to have previously claimed a DN. In this case the claimed DN will have been stored in non-volatile memory, such as a flash memory for example. The purpose of storing the DN in non-volatile memory is to preserve the DN in the event that the terminal set 100-X becomes inactive, e.g., due to accidental power loss or disconnection from the network 30, so that the DN may be reclaimed upon a return to an active state.

If it is determined at 810 that a DN has persisted for terminal set 100-X, the state machine transitions (905) to the DN Probe State 900. The presumption is that, in this case, the other terminal sets on the network will already have been notified of the presence of terminal set 100-X on the network, even if the other terminal sets currently consider the terminal set 100-X to be inactive.

If, on the other hand, it is determined at 810 that the terminal set does not have a persistent DN, this indicates that the terminal set 100-X is in an as-yet unconfigured (in terms of DN and routing table 200) "factory-fresh" condition. In this case, a counter used to track how many of the N instances of the I_AM_HERE message have been sent is initialized to zero (812). A random timer is then set between 0 and 2 seconds and a second timer is set for 2 seconds (814). The interval of 2 seconds for the second timer is to ensure that sufficient time is given to receive messages from other network devices for purposes of building routing table 200 (FIG. 4). Of course, this duration could differ in other embodiments. The counter is incremented (816) and the terminal set enters a "wait for message" state (820) in which it waits for a message to be received.

If the random timer expires while in the wait for message state, an I_AM_HERE multicast message is sent to the other terminal sets (822) and the terminal set 100-X returns to the wait for message state (820).

Any messages received from any other terminal set in the network at 820 are checked for a type (840).

If the received message is a DN_CONFLICT message, then the terminal set ignores the DN_CONFLICT message (since this message should not be received in the Initial State 800) and the state machine returns to the wait for message state (820).

If the received message is a I_AM_HERE message sent by another terminal set, then data from the received I_AM_HERE message (e.g. MAC address and IP address) is added to the routing table 200.

If the received message is a PEER_ASSERT message or a DN_PROBE message sent by another terminal set, then data within the PEER_ASSERT or DN_PROBE message may be added to the routing table 200 (these messages are described in more detail below).

If the received message is an INACTIVE_PEER_ASSERT, data contained within the INACTIVE_PEER_ASSERT message may be used to update the routing table 200 (870) (e.g. if the sending terminal set was not previously in the routing table 200, it may be added). Thereafter the MAC address in the INACTIVE_PEER_ASSERT message is compared to the local MAC address (i.e. the MAC address of the current terminal set 100-X) (872).

If they are found to be the same, this represents a situation in which the current terminal set 100-X is returning to an active state after a period of inactivity and has just received a message from another terminal set which is sending INACTIVE_PEER_ASSERT messages on behalf of terminal set 100-X. In this case, the terminal set will transition to the DN Probe State (905).

If, on the other hand, the MAC address in the received INACTIVE_PEER_ASSERT message is different from the local MAC address, then the terminal set returns to the wait for message state and waits for further messages (820).

When in the wait for message state, if the second timer expires, an assessment is made as to whether the counter has reached the maximum value of N (880).

If this assessment reveals that the value of the counter has not exceeded N, this indicates that fewer than N I_AM_HERE messages have been sent. In this case, the random timer and the second timer are reset (814) and the value of the counter is incremented (816) before returning to the wait state (820).

If, on the other hand, the assessment of 880 reveals that the value of the counter has is equal to N, this indicates that N I_AM_HERE messages have been sent. In this case, the state machine of terminal set 100-X transitions to the DN Probe State (906).

Figure 7:
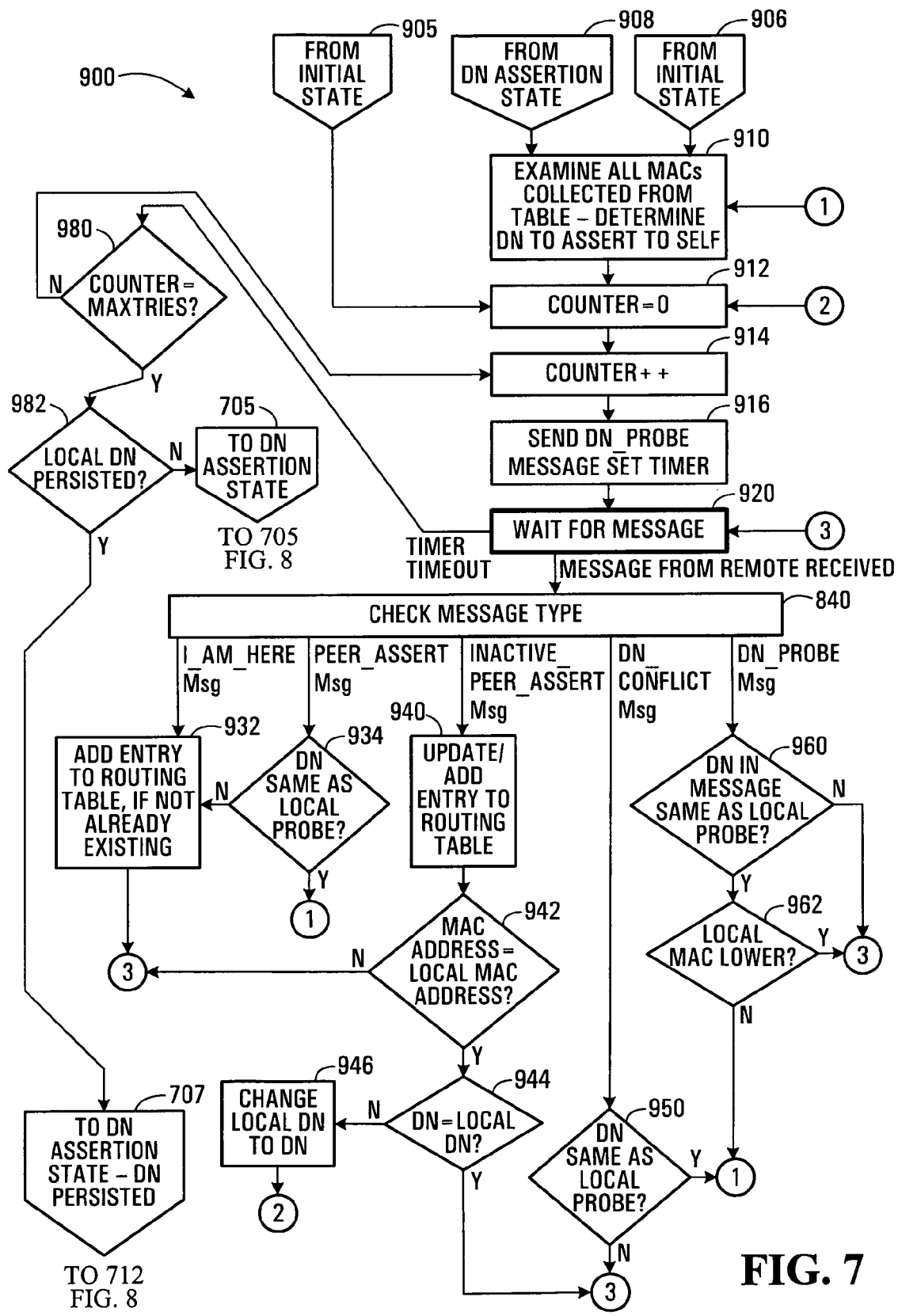
FIG. 7 is a flow chart illustrating operation of a terminal set in a Directory Number probe state shown in FIG. 5.

FIG. 7 is a flow chart illustrating operation of a terminal set 100-X in the DN Probe State 900 of FIG. 5. As shown in FIG. 7, there are two entry points into the DN Probe State 800. The first entry point is from the Initial State 900 at 905, and represents a situation in which the current terminal set has recalled its DN from non-volatile memory after a period of inactivity. The second entry point is also from the Initial State 800, but at 906 and represents a situation in which the terminal set 100-X has not previously claimed a DN. In the latter case, the terminal set selects a prospective DN at 910 (in the former case, the prospective DN will be the recalled DN).

To select a prospective DN (910), the terminal set 100-X, terminal set 100-X determines its ordinal position within the (sorted) list of terminal sets of routing table 200 (FIG. 4). For example, if terminal set 100-X is first in the list, the selected prospective DN may be 1 (its ordinal position) plus a base DN of, say, 200, for a prospective DN of 201. By basing the selection of a prospective DN on the unique ordinal position associated with the terminal set, selection of a unique prospective DN by each terminal set will be promoted in the scenario in which multiple factory-fresh terminal sets simultaneously join a network having no existing terminal sets with previously assigned DNs.

To guard against potential DN conflicts which may occur if terminal set 100-X is joining an established network, at 910 terminal set 100-x also consults its routing table 200 (FIG. 4) to determine whether the selected prospective DN is already assigned to another terminal set. If the prospective DN is already assigned, the newly-connected DN may select another prospective DN, e.g. by adding an offset such as 1 to the largest DN found in the list.

Following 910 (or from entry point 905), a counter whose purpose is to track the number of instances of the DN_PROBE message that have been sent is initialized (912) and incremented (914). An instance of the DN_PROBE message is sent and a timer used to count down the (fixed or random) time interval between DN_PROBE message instances is set (916). The terminal set 100-X then enters a "wait for event" state (920).

If a terminal set selects the same DN as another terminal set also in the probe state the terminal will look at the MAC address of both devices probed on the network a conflict is raised. In one embodiment, when there is conflict between terminal sets having the same DN, the terminal set having the lowest MAC address keeps the DN and the other terminal set must obtain another DN.

It is noted that a further entry point (908) into DN Probe State 900 exists from the DN Assertion State 700. This entry point 908 represents a situation in which a conflict has been found to exist between the DN claimed by the terminal set 100-X and the DN desired or claimed by one or more of the other terminal sets within the network. In such a case, operation commences at 910, described above.

From the wait for event state (920), if the timer expires, the terminal set 100-X ascertains whether the desired number M of DN_PROBE messages have already been sent (980). If it is determined that M DN_PROBE messages have already been sent, the terminal set next determines whether the prospective DN as been recalled from DN in the non-volatile memory (982). If the determination of 982 is made in the positive, the state machine transitions to the DN Assertion State 700 via 707; otherwise it transitions to the DN Assertion State 700 via 705.

Alternatively, if it is determined at 980 fewer than M DN_PROBE messages have been sent, operation returns to 914.

From the wait for event state (920), when a message is received from another terminal set, further operation depends upon the message type of the received message, which is ascertained at 930.

If the message type indicates an I_AM_HERE message, the terminal set adds data contained within the I_AM_HERE message to the routing table 200 if the data is not already present (932) before returning to the wait for event state (920).

If the message type indicates a PEER_ASSERT message, the DN from the PEER_ASSERT message compared to the local DN (i.e. the selected prospective DN)(934). If the DNs match, this represents a situation in which another terminal set is asserting the DN that terminal set 100-X has tentatively selected. In this case, operation returns to 910. If, on the other hand, the DNs do not match, the routing table 200 is updated with the data contained in PEER_ASSERT message if an entry for the terminal which sent the PEER_ASSERT message already exists, or if the entry does not already exist, the data contained in the PEER_ASSERT message is added to the routing table 200 to create the entry (932).

If the message type indicates an INACTIVE_PEER_ASSERT message has been received, the data contained in the INACTIVE_PEER_ASSERT message is added to the routing table 200 if an entry does not already exist or the routing table 200 is updated with the data if the entry does exist (940). Then the MAC address within the INACTIVE_PEER_ASSERT message is compared to the MAC address of terminal set 100-X (942).

If the MAC addresses differ, then the terminal set 100-X returns to the wait for event state (920).

Alternatively, if the MAC addresses are the same, this represents a situation in which the current terminal set 100-X is returning to an active state after a period of inactivity and has just received a message from another terminal set which is sending INACTIVE_PEER_ASSERT messages on behalf of terminal set 100-X. In this case, a further comparison is made (944) between the DN within the INACTIVE_PEER_ASSERT message and the DN currently being probed (i.e. the selected prospective DN).

If the DNs do not match, this represents a situation in which the terminal set 100-X is currently probing a DN which differs from the DN specified in the INACTIVE_PEER_ASSERT message. This may occur if the persistent DN stored in non-volatile memory of the terminal set 100-X was cleared or became corrupted while the terminal set 100-X was inactive. In this case, to prevent the terminal set 100-X from probing a different DN that was previously claimed, the selected prospective DN is reset to the DN from the message (946), and operation returns to 912 so that the terminal set 100-X will take steps to probe its previously claimed DN.

Alternatively, if the DNs are found to match (at 944), this represents a situation in which the terminal set 100-X is currently probing the same DN as is specified in the INACTIVE_PEER_ASSERT message, which should represent the DN previously claimed by terminal set 100-X before it was determined to be inactive. In this case, operation returns to the wait for event state (920).

If the message type indicates a DN_CONFLICT message is being received, this may represent a situation in which another terminal set is objecting to the probed prospective DN. In this case, a comparison is made (950) between the DN within the DN_CONFLICT message and the DN currently being probed.

If the DNs do not match, no further action is taken with respect to the DN_CONFLICT message, and operation returns to the wait for event state (920). In the case where the DN_CONFLICT message is multicast, this represents ignoring a DN_CONFLICT message intended for another terminal set. In the case where the DN_CONFLICT message is unicast, this may represent a situation in which a second of two DN_CONFLICT messages from different terminal sets has been received and is being ignored because, since the first DN_CONFLICT message was received, the current terminal set has begun probing a different DN than it had probed earlier.

Alternatively, if the DNs are found to match at 950, this represents a situation in which another terminal set is objecting to the DN prospectively selected by the current terminal set 100-X. In this case, operation returns to 910 so that another prospective DN may be selected and probed.

If the message type indicates a DN_PROBE message has been received, another terminal set is probing a selected prospective DN in much the same manner as the current terminal set 100-X is probing its selected prospective DN. The prospective DN of the other terminal set (which is indicated in the incoming DN_PROBE message) is compared to the locally selected prospective DN (960).

If the DNs do not match, no further action is taken with respect to the incoming DN_PROBE message, and operation returns to the wait for event state (920).

Alternatively, if the DNs are found to match at 960, this means that another terminal set is probing the same DN as the current terminal set 100-X. In this case, a conflict exists between the prospective DNs. In the present embodiment, such conflicts are resolved on the basis of the unique MAC addresses of the respective terminal sets. In particular, the terminal set having the lowest MAC address ("lowest active MAC" or LAM) is allowed to claim the DN, and the other terminal set will select another DN. It will be appreciated that other equally valid conflict resolution schemes may be applied. For example, the highest active MAC may be allowed to claim the DN in an alternative embodiment. The details of the chosen scheme are not important as long as the scheme is consistently applied at each terminal set.

Thus, according to the operative conflict resolution scheme, the MAC address within the DN_PROBE message is compared to the local MAC address (962). If the MAC address within the DN_PROBE message has a lower value than that of the local MAC address, the other terminal set is permitted to claim the DN, and the current terminal set returns to 910 to select another prospective DN. Otherwise, the terminal set ignores the DN_PROBE message by returns to the wait for event state (920), effectively maintaining its prospective DN.

Figure 8:
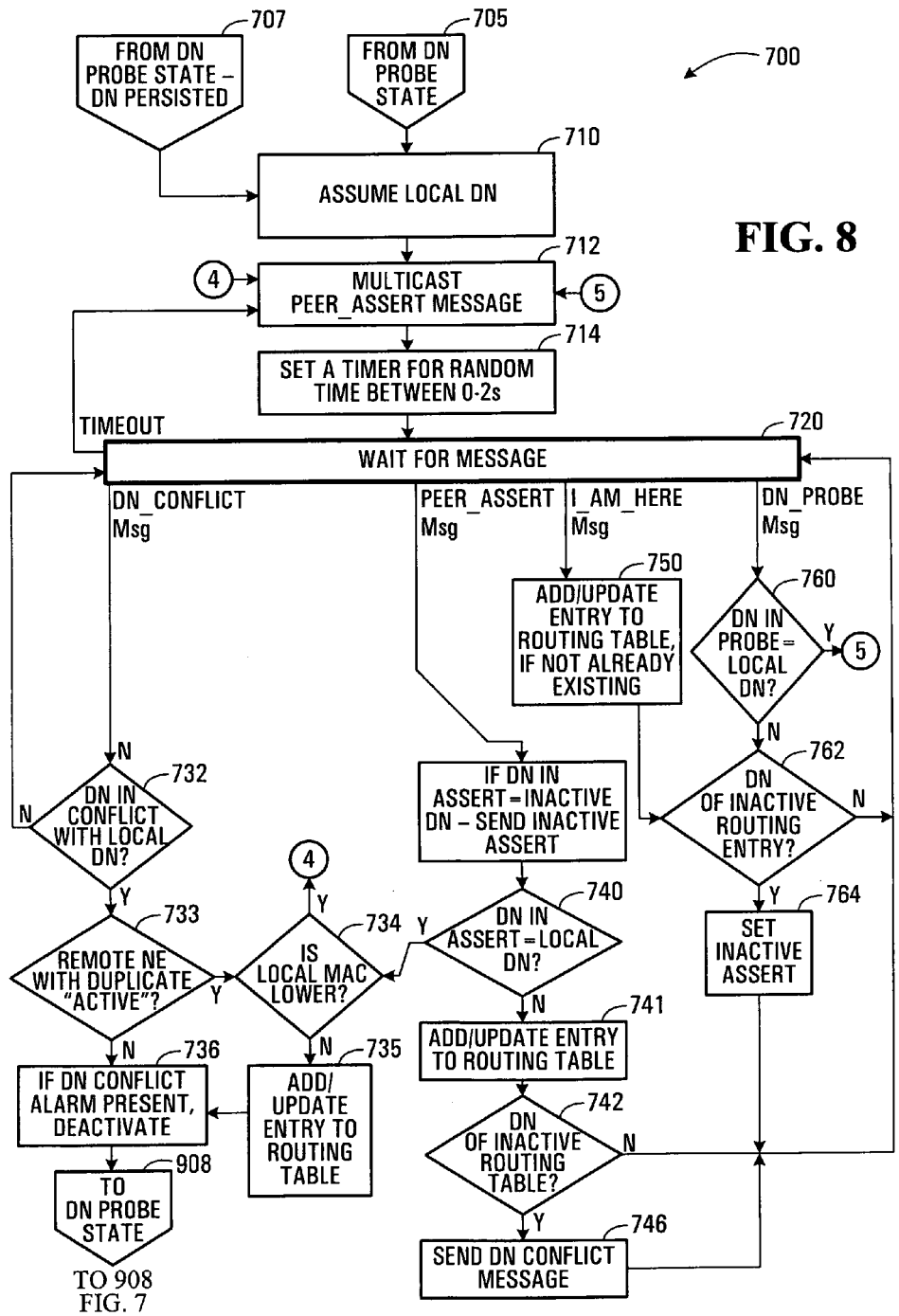
FIG. 8 is a flow chart illustrating operation of a terminal set in a DN Assertion State shown in FIG. 5.

FIG. 8 is a flow chart illustrating operation of the terminal set 100-X in the DN assertion state shown in FIG. 5. As previously described, the terminal set may transition into this state from the DN Probe State 900 without a persistent DN (705). In this case, the terminal set 100-X initially assumes the prospective DN which was just probed in the DN Probe State 900 (710). Subsequently, a multicast PEER_ASSERT message sent to other terminal sets on the network (712).

Alternatively, the terminal set may transition from the DN Probe State 900 with a persistent DN (707), in which case operation begins at 712.

Following 712, a timer is set for a random time interval between 0 seconds and 2 seconds (714). The terminal set 100-X then waits for a message to be received or for a timer to expire in the "wait for message" state (720).

If the timer expires, operation returns to 712, and another multicast PEER_ASSERT message is sent.

If a DN_CONFLICT message is received, then the terminal set verifies whether the DN contained in the DN_CONFLICT message is in conflict with the local DN (732).

If it is determined that the DN contained in the DN_CONFLICT message matches the locally claimed DN, this is indicative of a conflict due to duplicate DNs on the network. In this case, a further assessment is made as to whether the remote conflicting terminal set is active (733).

If the remote set is found to be active, and if the operative conflict resolution scheme (i.e. lowest active MAC address prevails) indicates that the current terminal set should keep its claimed DN (734), operation returns to 712, causing the terminal set to immediately send another PEER_ASSERT message.

If, on the other hand, it is determined in 734 that the current terminal set should not keep its claimed DN, the routing table 200 (FIG. 4) is updated with the data in the DN_CONFLICT message (735). Specifically, the terminal set having the conflicting DN may be added to the routing table 200, along with its DN. This is so that, on a subsequent selection by the current terminal set 100-X of a prospective DN which happens to match the conflicting DN, a check of the prospective DN against the DNs in the routing table 200 will reveal the conflict.

Thereafter, any conflict alarms are deactivated (736) and the terminal set 100-X transitions to the DN Probe State 900 (908). A conflict alarm is a notification of a DN conflict which may be sent to a system administrator in some embodiments of the invention. Conflict alarms are usually raised only in cases where a system administrator has manually reset a DN to an existing terminal set's claimed DN.

If it is determined at 733 that the remote terminal device is inactive, then any DN present conflict alarms are deactivated (736) and the terminal set transitions to the DN Probe State 900 (908).

Referring again to the wait for message state 720, if a PEER_ASSERT message is received, and if the DN in the PEER_ASSERT message is equal to a DN of one or more inactive terminal sets in the routing table 200, this represents a situation in which the current terminal set 100-X may be required to send an INACTIVE_PEER_ASSERT message on behalf of an inactive terminal set. This situation may arise for example where a network becomes segmented into two sub-networks such that terminal sets on one sub-network consider terminal sets on another sub-network to be inactive. A terminal set on one sub-network may be sending PEER_ASSERT messages while its surrogate, which is on the other sub-network, is sending INACTIVE_PEER_ASSERT messages on its behalf. On reconnection of the sub-networks, the surrogate could receive a PEER_ASSERT from the terminal set it still believes to be inactive.

The determination of whether the current terminal set 100-X should to send an INACTIVE_PEER_ASSERT message on behalf of an inactive terminal set based on an operative scheme for determining which terminal set is responsible (or which terminal sets are responsible) for sending INACTIVE_PEER_ASSERT messages on behalf of an inactive peer. In the present embodiment, the operative scheme assigns this responsibility to one and only one terminal set per given inactive peer (with the same terminal set possibly being responsible for multiple inactive peers). The rationale for making only one terminal set responsible for sending INACTIVE_PEER_ASSERT messages for any given inactive peer is to avoid unnecessary transmission of duplicate INACTIVE_PEER_ASSERT messages. For such schemes, it is desirable to ensure that each terminal set stays within its Initial State 800 (FIG. 5) for a duration that is longer than the time required to detect an inactive terminal set.

The operative scheme is illustrated in Table 1 below:

TABLE 1

Peers Responsible for Inactive Peer Asserts

| Tel. set | State | Sends Inactive Asserts? | On behalf of? |
|---|---|---|---|
| A | Inactive | — | — |
| B | Active | Yes | B |
| C | Inactive | — | — |
| D | Active | No | — |
| E | Active | Yes | F, G |
| F | Inactive | — | — |

TABLE 1-continued

Peers Responsible for Inactive Peer Asserts

| Tel. set | State | Sends Inactive Asserts? | On behalf of? |
|---|---|---|---|
| G | Inactive | — | — |
| H | Active | Yes | A |

The first two columns of Table 1 represent a subset of the information maintained in the routing table 200 of FIG. 4 which is relevant to the determination of "surrogate" peers (i.e. peers responsible for sending INACTIVE_PEER_ASSERT messages on behalf of other inactive peers). Each row in Table 1 represents a network device, as identified in the first column, in a hypothetical network. The network devices of Table 1 are understood to be sorted by some unique identifier, such as MAC address, as in routing table 200. The active or inactive status of each network device is provided in the second column of Table 1.

In the operative scheme, an active network device acts as the surrogate for each inactive network device which follows it (i.e. is in a lower row) in Table 1 with no active network device interceding in the list between the surrogate and the inactive network device. For example, as shown in Table 1, network device E acts as the surrogate for network devices F and G, since both of those devices are inactive and follow device E with no other active device interceding between them and device E.

In the event that an inactive network device precedes the first active network device within the sorted list (e.g., as is the case for network device A), then the last active network device within the sorted list (network device H) will acts as its surrogate.

It will be appreciated that other schemes for assigning surrogates may be adopted in alternative embodiments. For example, one alternative scheme may assign an active network device as a surrogate for inactive devices preceding it, rather than succeeding it, in the routing table. In another scheme, a network device may act as a surrogate for all inactive devices adjacent to it within the table, with the term "adjacent" as used herein including multiple contiguous inactive network devices either immediately above or immediately below a surrogate within a routing table. In the latter scheme, each inactive network device will have two surrogates. This level of redundancy may be desired in some embodiments.

Referring again to FIG. 8, following 738, terminal set 100-X verifies whether a DN contained in the received PEER_ASSERT message matches to the locally claimed DN (740). If they match, operation proceeds with 734 as previously described. If the DNs do not match, the terminal set 100-X either adds the data within the PEER_ASSERT message to the routing table or uses it to update the relevant entry in the table (741).

Next, an assessment is made as to whether the DN contained in the PEER_ASSERT message corresponds to a DN of an inactive entry for which the current terminal set 100-X acts as a surrogate (742). If the assessment is made in the positive, a DN_CONFLICT message is sent as a multicast message indicating a conflict in DNs (746) before returning to 720 to wait for another message. If the assessment of 742 is made in the negative, the terminal set 100-X immediately returns to 720 to wait for another message.

If an I_AM_HERE message is received while in the wait for message state 720, the terminal set 100-X adds or updates the entry in the routing table 200 (FIG. 4) which corresponds to the terminal set from which the I_AM_HERE message originated with data from the I_AM_HERE message (750), and then proceeds to 762 (described below).

If a DN_PROBE message is received at 720, the terminal set compares the DN in the DN_PROBE message with the locally claimed DN (760). If they match, this represents a situation in which another terminal set has selected the claimed DN of the current terminal set 100-X as its prospective DN. In this case, operation returns to 712 to immediately transmit a multicast PEER_ASSERT message to effectively notify the other terminal set that the DN which it has tentatively selected is already claimed.

If the comparison of 760 shows that the DNs do not match, terminal set 100-X consults the routing table 200 to determine whether the DN contained in the DN_PROBE message corresponds to a DN of an inactive terminal set (762). If the DN contained in the DN_PROBE message corresponds to an inactive terminal set, an INACTIVE_ASSERT_MESSAGE message is sent to a terminal set from which the DN_PROBE message originated, presuming that the current terminal set is deemed to be the surrogate for that inactive terminal set (using the above-described operative scheme). Thereafter, operation returns to 720 to await another message. If the consultation performed in 762 indicates that the originator of the DN_PROBE message is active, terminal set 100-X returns directly to 720 to wait for another message.

Advantageously, when multiple terminal sets implementing the state machine of FIG. 5 are connected to a network and engage in the above-described operation to arrive at the steady state (i.e. the DN Assertion State 700), each will have automatically selected a DN, with any DN conflicts between terminal sets having been automatically resolved without the need for human intervention. Moreover, each terminal set will have automatically created a local routing table 200 including the DN of every other terminal set on the network paired with other information (e.g. IP addresses) sufficient to permit the terminal set to call any other terminal set upon dialing of that terminal set's DN. Moreover, even if the terminal set becomes inactive, when it is reconnected to the network its DN will persist.

The above embodiment refer to a push system in which a terminal set on a network transmits data to other terminal sets on the network and allows each terminal set to build a routing table. The routing table is maintained by the terminal sets sending PEER_ASSERT messages at periodic intervals. In some embodiments of the invention, there is a pull system in which a network device such as a terminal set for example polls other network devices on a network to obtain routing information.

Figure 9:
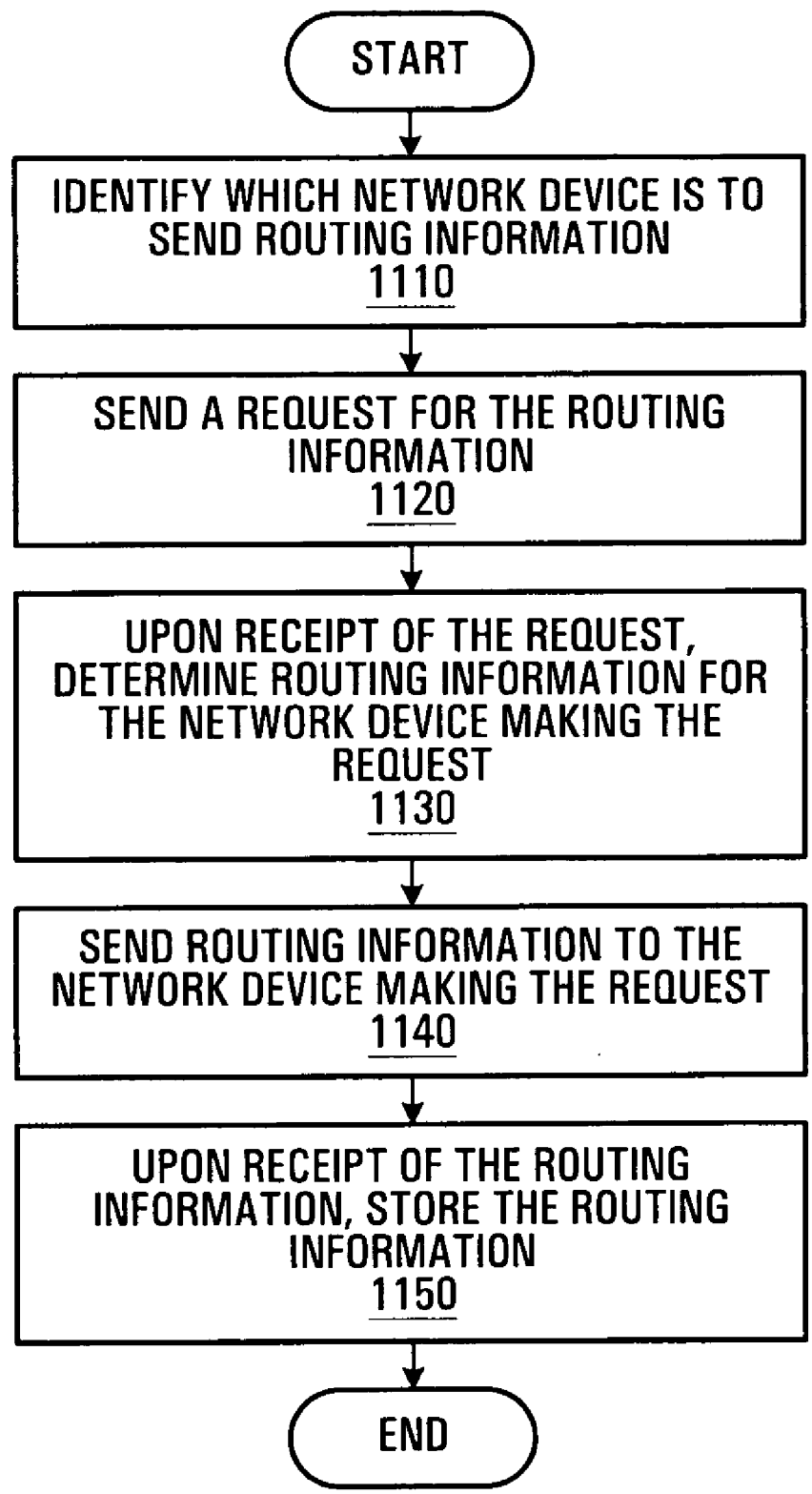
FIG. 9 is a flow chart illustrating operation for peer discovery in a distributed network, according to another embodiment of the invention.

Referring to FIG. 9, shown is a method for peer discovery in a distributed network, according to another embodiment of the invention. A network device that becomes available on a network for example when it is powered up requires routing information such as a DN, for example, for itself and for other network devices on the network. Initially, the network device identifies which network device from at least one other network device present on a network is to send it routing information (1110). In some embodiments of the invention, a message is sent to the other network devices on the network at 1110 requesting an indicator of which other network device is to send routing information. The indicator may be a timestamp or a MAC address for example. Each of the other network devices sends its respective indicator to the network device and upon receipt of the indicators, the network device using the indicator to determine which of the other network devices is to send the routing information. For example, in some embodiments the indicator is a timestamp and the network device having a latest timestamp is selected for sending routing information.

Next the network device sends a message to the other network device that is to send the routing information for requesting the routing information (1120). The network device receiving the request has a routing table containing routing information for the other network devices and determines routing information for the network device making the request (1130). In particular, in some embodiments of the invention a DN for the network device making the request is selected. The network device receiving the request sends the routing information for the other network devices and for the network device making the request (1140). The network device making the request receives the routing information and stores the routing information (1150).

In some embodiments of the invention, instead of being determined at 1130 the routing information for the network device making the request is determined upon receipt of the routing information at step 1150 by the network device making the request. Furthermore, in some embodiments of the invention 1110 is performed in more then one step. In a first step, the network device polls addresses on a network to determine which network devices are on the network. In a second step, the network device sends a message to the other network devices requesting the indicator. In a third step, responsive to receiving the indicators from the other network devices, using the indicators the network device determines which of the other network devices is to send routing information. In some embodiments of the invention, the first and second step are combined into one step in which the request for the indicator is made in conjunction with the addresses being polled.

Figure 10:
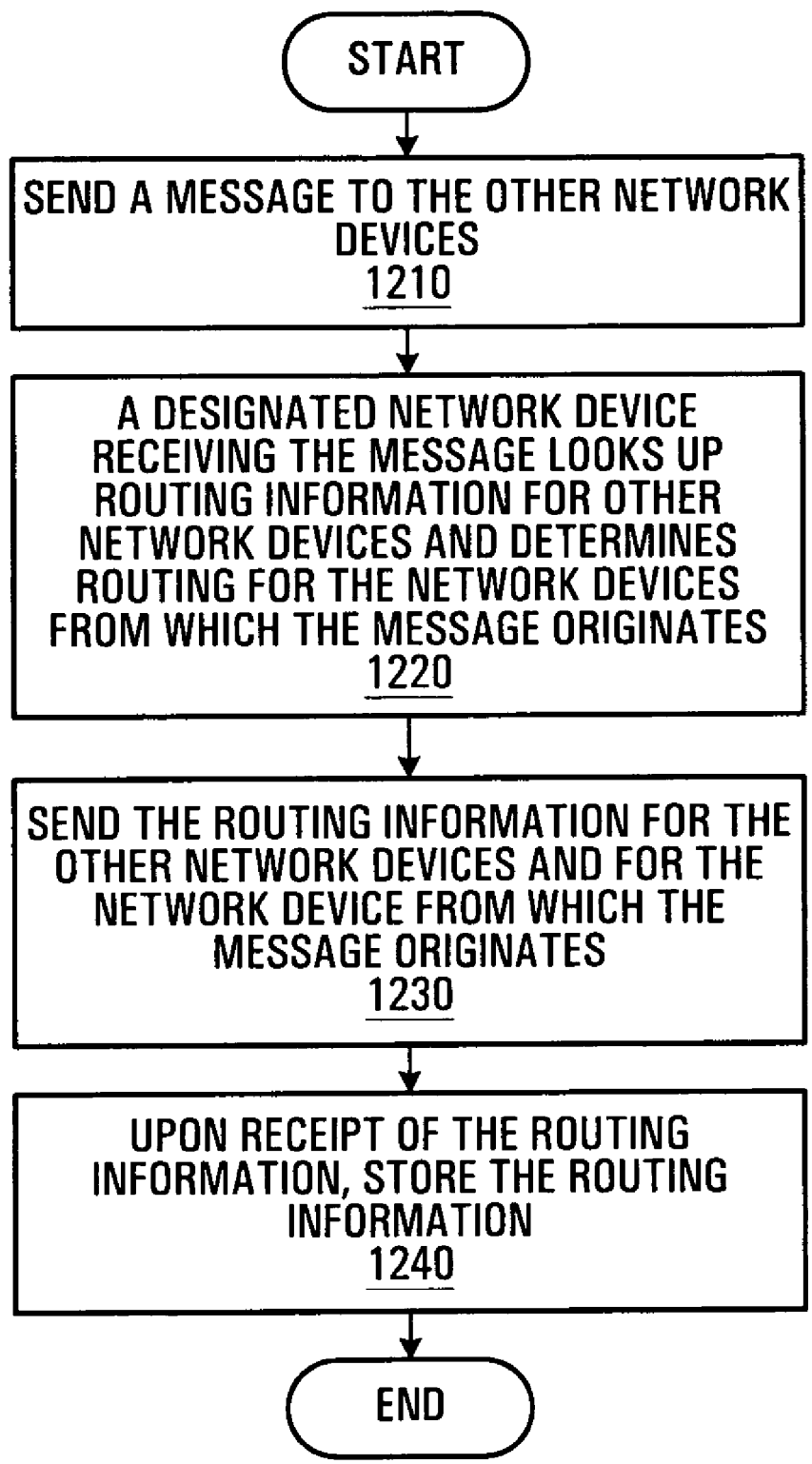
FIG. 10 is a flow chart illustrating operation for peer discovery in a distributed network, according to yet another embodiment of the invention.

Referring to FIG. 10, shown is a method for peer discovery in a distributed network, according to yet another embodiment of the invention. In the embodiment of FIG. 10, a network device is designated for maintaining a routing table and updating other network devices with routing information in the routing table. Initially, when a network device becomes available on a network, for example at power-up, the network device sends a message to other network devices on the network (1210). Upon receipt of the message, one of the other network devices designated for maintaining routing information, looks-up routing information for the other network devices and determines routing information for the network device from which the message is received (1220). For example, a DN for the network device from which the message is received is determined from DNs looked-up as part of routing information for the other network devices. The designated network device then sends to the network device from which the message originates the routing information for the other network devices and for the network device from which the message originates (1230). Upon receipt of the routing information from the designated network device, the routing information is stored (1240).

As will be appreciated by those skilled in the art, modifications to the above-described embodiment can be made without departing from the essence of the invention. For example, although the described embodiment largely refers to peers that are terminal sets, it will be appreciated that the described methods are equally applicable to peers other than terminal sets, such as other forms of network devices. As well, network devices may be interconnected by any form of network, not just a LAN. Further, although the description refers to the selection, probing and assertion of directory numbers, it will be appreciated that the described methods are equally applicable to network addresses other than directory numbers.

Finally, while the above-described methods and state machine are described as being implemented by or at each network device, it will be appreciated that they could be implemented externally to the network device but nevertheless still be associated with said network device (e.g. at a peripheral device). In this case, the methods and state machine would still be considered to be performed by or at the network device.

Numerous further modifications and variations of the present invention are possible in light of the above teachings. It is therefore to be understood that within the scope of the appended claims, the invention may be practiced otherwise than as specifically described herein.

What is claimed is:

1. At one network peer of a plurality of network peers, a method comprising:
    sending an existence notification;
    receiving one or more active peer existence notifications from one or more other active network peers currently connected to the network;
    receiving from one or more active network peers one or more inactive peer existence notifications concerning one or more inactive network peers previously connected to the network but not currently connected to the network; and
    based on the received active and inactive existence notifications, selecting a prospective network address for said one network peer.

2. The method of claim 1 wherein each existence notification includes a unique network peer identifier.

3. The method of claim 2 wherein said unique network peer identifier is a hardware address.

4. The method of claim 2 wherein said selecting is based on each said unique network peer identifier.

5. At one network device of a plurality of network devices, a method comprising:
    sending an existence notification;
    receiving one or more existence notifications from one or more other network devices; and
    based on the received existence notifications, selecting a prospective network address for said one network device,
    wherein each existence notification includes a unique network device identifier, and
    wherein said selecting comprises:
    sorting each said unique network device identifier of said other network devices along with a unique identifier of said one network device, said sorting resulting in a sorted list of said plurality of network devices;
    determining an ordinal position of said one network device within the sorted list; and
    from said ordinal position, creating said prospective network address.

6. The method of claim 5 wherein said creating a prospective network address comprises adding an offset associated with said ordinal position to a base address.

7. The method of claim 1 wherein said sending an existence notification comprises sending a network connection message.

8. The method of claim 7 wherein said sending a network connection message comprises sending two or more instances of said message at either of a fixed time interval or a random time interval.

9. The method of claim 1 wherein said sending comprises multicasting.

10. The method of claim 1 further comprising:
determining whether a conflict exists between said prospective network address and a network address claimed by any of said other network peers; and
if a conflict exists, resolving said conflict so that said prospective network address is claimed by only one of said plurality of network peers.

11. The method of claim 10 wherein said received existence notifications include an indication of network addresses claimed by said other network peers.

12. The method of claim 11 wherein said determining whether a conflict exists comprises establishing whether said network addresses claimed by said other network peers include said prospective network address.

13. The method of claim 12 wherein, if said establishing establishes that said network addresses of said other network peers include said prospective network address, said resolving comprises selecting a new prospective network address for said one network peer and repeating said determining whether a conflict exists for said new prospective network address.

14. The method of claim 12 wherein said determining whether a conflict exists further comprises, if said establishing establishes that said network addresses of said other network peers do not include said prospective network address, notifying each of said other network peers of said prospective network address and awaiting receipt of any objections from any of said other network peers to the claiming by said one network peer of said prospective network address.

15. The method of claim 14 further comprising, if said one network peer fails to receive an objection from any of said other network peers to the claiming by said one network peer of said prospective network address, claiming said prospective network address as the network address of said one network peer.

16. The method of claim 14 wherein, if said one network peer receives an objection from any of said other network peers to the claiming by said one network peer of said prospective network address, said resolving comprises selecting a new prospective network address for said one network peer and repeating said determining whether a conflict exists for said new prospective network address.

17. The method of claim 16 further comprising applying a network address conflict resolution scheme upon receiving said objection and wherein said selecting a new prospective address is conditional upon a determination by said network address resolution scheme that said one network peer should not claim said network address.

18. The method of claim 17 wherein said network address conflict resolution scheme is a comparison of a unique identifier of said one network peer and the unique identifier of another network peer on behalf of which said objection was sent.

19. The method of claim 1 wherein said network address is a directory number.

20. The method of claim 19 wherein said directory number is a telephone extension and wherein said network peer is a telephone set.

21. A network peer for use with one or more other network peers in a network, said network peer and said other network peers cumulatively forming a plurality of network peers, said network peer adapted to:
send an existence notification;
receive one or more active peer existence notifications from said other network peers currently connected to the network;
receive from one or more network peers currently connected to the network one or more inactive peer existence notifications concerning one or more network peers previously connected to the network but not currently connected to the network; and
based on the received active and inactive existence notifications, select a prospective network address for said network device peer.

22. The network peer of claim 21 wherein each existence notification includes a unique network peer identifier.

23. The network peer of claim 22 wherein said unique network peer identifier is a hardware address.

24. The network peer of claim 22 wherein said selecting is based on each said unique network device peer identifier.

25. A network device for use with one or more other network devices, said network device and said other network devices cumulatively forming a plurality of network devices, said network device adapted to:
send an existence notification;
receive one or more existence notifications from said other network devices; and
based on the received existence notifications, select a prospective network address for said network device,
wherein each existence notification includes a unique network device identifier, and
wherein said selecting comprises:
sorting each said unique network device identifier of said other network devices along with a unique identifier of said network device, said sorting resulting in a sorted list of said plurality of network devices;
determining an ordinal position of said network device within the sorted list; and
from said ordinal position, creating said prospective network address.

26. The network device of claim 25 wherein said creating a prospective network address comprises adding an offset associated with said ordinal position to a base address.

27. The network peer of claim 21 wherein said sending an existence notification comprises sending a network connection message.

28. The network peer of claim 27 wherein said sending a network connection message comprises sending two or more instances of said message at either of a fixed time interval or a random time interval.

29. The network peer of claim 21 wherein said sending comprises multicasting.

30. The network peer of claim 21 further adapted to:
determine whether a conflict exists between said prospective network address and a network address claimed by any of said other network peers; and
if a conflict exists, resolve said conflict so that said prospective network address is claimed by only one of said plurality of network peers.

31. The network peer of claim 30 wherein said received existence notifications include an indication of network addresses claimed by said other network peers.

32. The network peer of claim 31 wherein said determining whether a conflict exists comprises establishing whether said network addresses claimed by said other network peers include said prospective network address.

33. The network peer of claim 32 wherein, if said establishing establishes that said network addresses of said other network peers include said prospective network address, said resolving comprises selecting a new prospective network address for said network peer and repeating said determining whether a conflict exists for said new prospective network address.

34. The network peer of claim 32 wherein said determining whether a conflict exists further comprises, if said establishing establishes that said network addresses of said other network peers do not include said prospective network address, notifying each of said other network peers of said prospective network address and awaiting receipt of any objections from any of said other network peers to the claiming by said network peer of said prospective network address.

35. The network peer of claim 34 further adapted to, if said network peer fails to receive an objection from any of said other network peers to the claiming by said network peer of said prospective network address, claim said prospective network address as the network address of said network peer.

36. The network peer of claim 34 wherein, if said network peer receives an objection from any of said other network peers to the claiming by said network peer of said prospective network address, said resolving comprises selecting a new prospective network address for said network peer and repeating said determining whether a conflict exists for said new prospective network address.

37. The network peer of claim 36 further adapted to apply a network address conflict resolution scheme upon receiving said objection and wherein said selecting a new prospective address is conditional upon a determination by said network address resolution scheme that said network peer should not claim said network address.

38. The network peer of claim 37 wherein said network address conflict resolution scheme is a comparison of a unique identifier of said network peer and the unique identifier of another network peer on behalf of which said objection was sent.

39. The network peer of claim 21 wherein said network address is a directory number.

40. The network peer of claim 39 wherein said directory number is a telephone extension and wherein said network device is a telephone set.

41. A machine-readable medium including machine-executable code for execution at one network peer of a plurality of network peers, comprising:
    machine-executable code for sending an existence notification;
    machine-executable code for receiving one or more active peer existence notifications from one or more other active network peers currently connected to the network;
    machine-executable code for receiving from one or more active network peers one or more inactive peer existence notifications concerning one or more inactive network peers previously connected to the network but not currently connected to the network; and
    machine-executable code for selecting a prospective network address for said one network peer based on the received existence notifications.

42. The machine-readable medium of claim 41 wherein each existence notification includes a unique network peer identifier.

43. The machine-readable medium of claim 42 wherein said unique network peer identifier is a hardware address.

44. The machine-readable medium of claim 42 wherein said selecting is based on each said unique network device peer identifier.

45. A machine-readable medium including machine-executable code for execution at one network device of a plurality of network devices, comprising:
    machine-executable code for sending an existence notification;
    machine-executable code for receiving one or more existence notifications from one or more other network devices; and
    machine-executable code for selecting a prospective network address for said one network device based on the received existence notifications,
    wherein each existence notification includes a unique network device identifier, and
    wherein said selecting comprises:
    sorting each said unique network device identifier of said other network devices along with a unique identifier of said one network device, said sorting resulting in a sorted list of said plurality of network devices;
    determining an ordinal position of said one network device within the sorted list; and
    from said ordinal position, creating said prospective network address.

46. The machine-readable medium of claim 45 wherein said creating a prospective network address comprises adding an offset associated with said ordinal position to a base address.

47. The machine-readable medium of claim 41 wherein said sending an existence notification comprises sending a network connection message.

48. The machine-readable medium of claim 47 wherein said sending a network connection message comprises sending two or more instances of said message at either of a fixed time interval or a random time interval.

49. The machine-readable medium of claim 41 wherein said sending comprises multicasting.

50. The machine-readable medium of claim 41 further comprising:
    machine-executable code for determining whether a conflict exists between said prospective network address and a network address claimed by any of said other network peers; and
    machine-executable code for, if a conflict exists, resolving said conflict so that said prospective network address is claimed by only one of said plurality of network peers.

51. The machine-readable medium of claim 50 wherein said received existence notifications include an indication of network addresses claimed by said other network peers.

52. The machine-readable medium of claim 51 wherein said determining whether a conflict exists comprises establishing whether said network addresses claimed by said other network peers include said prospective network address.

53. The machine-readable medium of claim 52 wherein, if said establishing establishes that said network addresses of said other network peers include said prospective network address, said resolving comprises selecting a new prospective network address for said one network peer and repeating said determining whether a conflict exists for said new prospective network address.

54. The machine-readable medium of claim 52 wherein said determining whether a conflict exists further comprises, if said establishing establishes that said network addresses of said other network peers do not include said prospective network address, notifying each of said other network peers of said prospective network address and awaiting receipt of any objections from any of said other network peers to the claiming by said one network peer of said prospective network address.

55. The machine-readable medium of claim 54 further comprising machine-executable code for, if said one network peer fails to receive an objection from any of said other network peers to the claiming by said one network peer of said prospective network address, claiming said prospective network address as the network address of said one network peer.

56. The machine-readable medium of claim 54 wherein, if said one network peer receives an objection from any of said other network peers to the claiming by said one network peer of said prospective network address, said resolving comprises selecting a new prospective network address for said one network peer and repeating said determining whether a conflict exists for said new prospective network address.

57. The machine-readable medium of claim 56 further comprising machine-executable code for applying a network address conflict resolution scheme upon receiving said objection and wherein said selecting a new prospective address is conditional upon a determination by said network address resolution scheme that said one network peer should not claim said network address.

58. The machine-readable medium of claim 57 wherein said network address conflict resolution scheme is a comparison of a unique identifier of said one network peer and the unique identifier of another network peer on behalf of which said objection was sent.

59. The machine-readable medium of claim 41 wherein said network address is a directory number.

60. The machine-readable medium of claim 59 wherein said directory number is a telephone extension and wherein said network peer is a telephone set.

* * * * *